Nov. 18, 1941.  H. W. WHITE  2,263,151
WINDSHIELD WIPER MOTOR
Filed Jan. 27, 1941  3 Sheets-Sheet 1
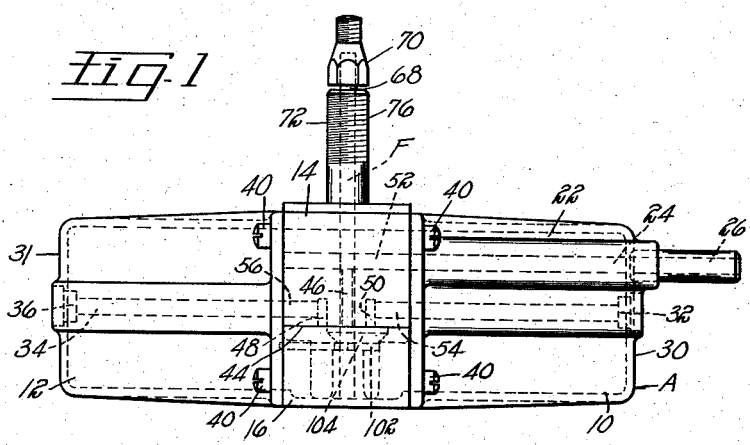
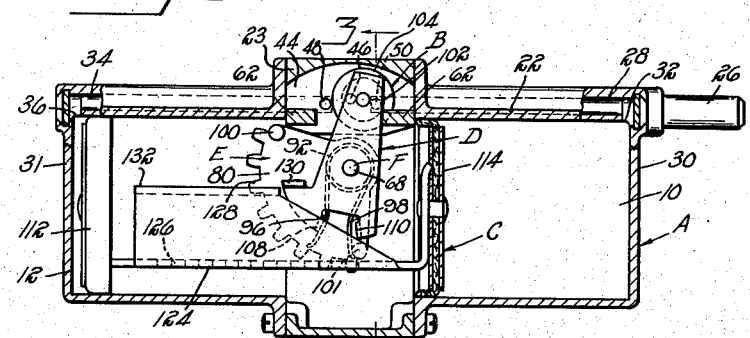
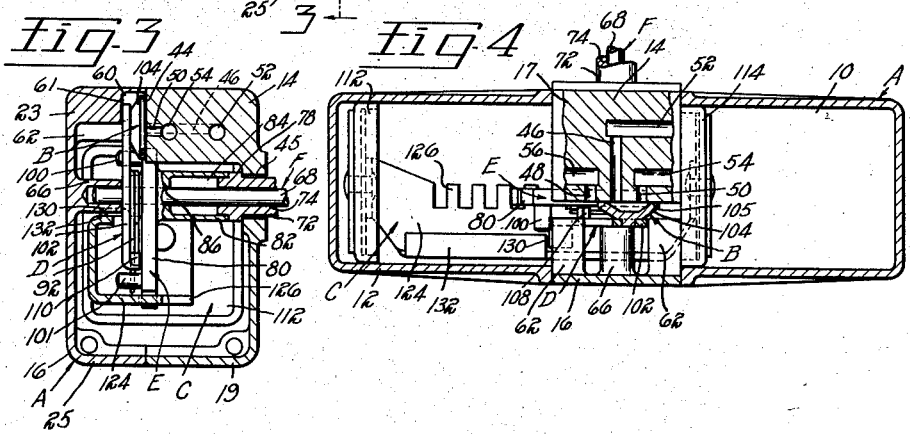
Inventor
HAROLD W. WHITE Nov. 18, 1941.  H. W. WHITE  2,263,151
WINDSHIELD WIPER MOTOR
Filed Jan. 27, 1941  3 Sheets-Sheet 2
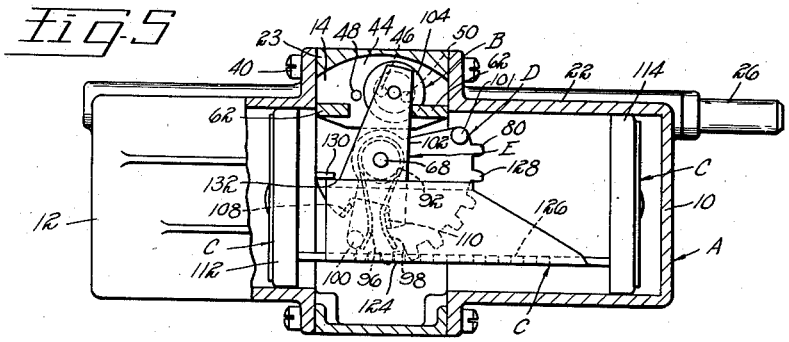
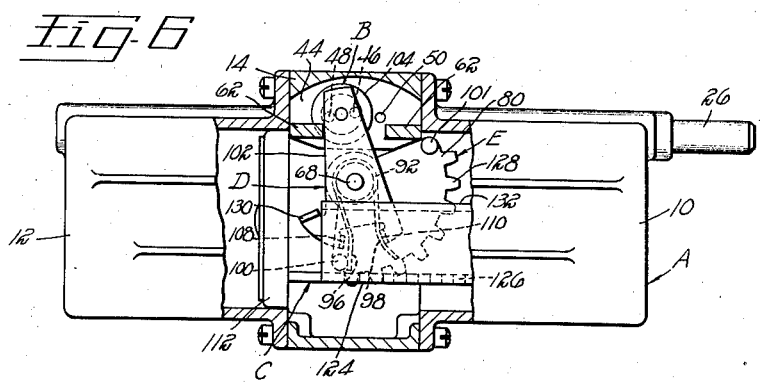
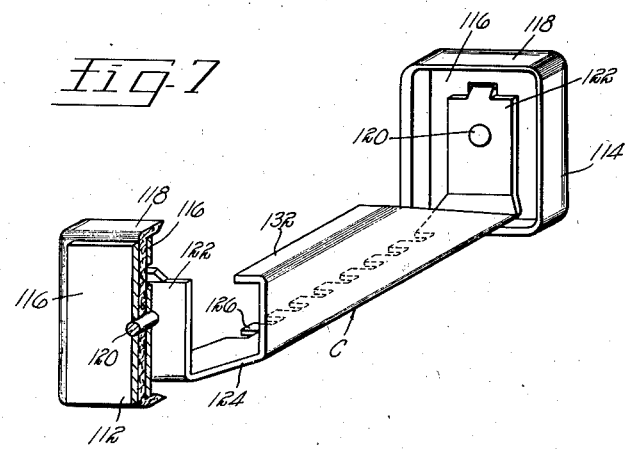
Inventor
HAROLD W. WHITE

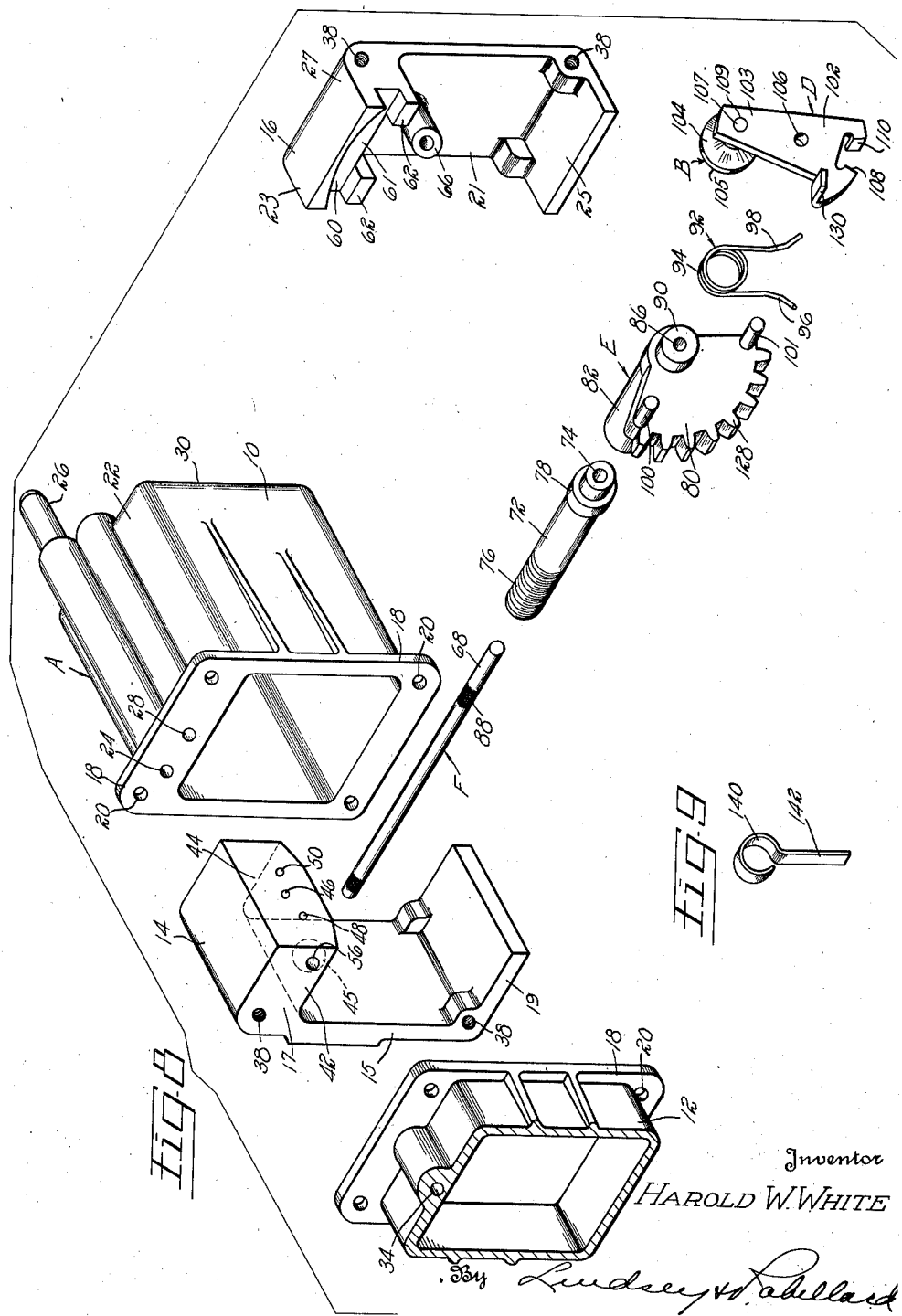

Patented Nov. 18, 1941

2,263,151

UNITED STATES PATENT OFFICE 2,263,151

WINDSHIELD WIPER MOTOR

Harold W. White, Saybrook, Conn., assignor to Ike Cohen, Colchester, Conn.

Application January 27, 1941, Serial No. 376,038

19 Claims. (Cl. 121—164)

The present invention relates to fluid operated motors and more particularly to a fluid operated motor of the type utilized for the operation of windshield wipers.

The object of the present invention is to provide in fluid operated motors of the above-indicated type an improved valve actuating mechanism for alternately connecting the opposed ends of the motor to the operating medium, which, in the case of a windshield wiper, is sub-atmospheric pressure.

Another object is to provide an improved motor including casing means which cooperate with the actuating means to provide supports therefor and wherein the parts may be readily and quickly assembled or disassembled to permit the parts to be repaired.

Still another object is the provision of means for assuring that the wiper will be actuated through a full predetermined stroke before there is any reversal thereof and wherein such means also function to assure a positive snap action of the valve mechanism.

A still further object is a motor of the above-indicated type utilizing a minimum number of parts and wherein said parts are of extremely rugged construction, thus assuring a long life for the motor as well as efficient and positive operation when in service.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings:

Figure 1 is a plan view of the assembled motor;

Fig. 2 is a side view with the casing in section to show the internal construction;

Fig. 3 is an end view taken on the line 3—3 of Fig. 2;

Fig. 4 is a plan view with the casing and valve mechanism partly in section to show the details of construction thereof;

Fig. 5 is a side view with the casing in section and with the motivating fluid connected to the right-hand side of the motor and just prior to the shifting of the valve to connect the fluid to the opposite end of the motor;

Fig. 6 is a view showing the valve mechanism in position immediately after the shifting of the valve from the position shown in Fig. 5 to the opposite side;

Fig. 7 is a perspective view of the piston;

Fig. 8 is an exploded perspective view showing all of the parts of the motor, except the piston, which is shown in Fig. 7; and Fig. 9 is a modified view of the valve actuating spring means.

Referring to the drawings, the motor comprises generally a casing A in which there is mounted an oscillating valve B for alternately connecting the opposite ends of the casing to a source of suction to cause a reciprocating motion of a piston C, which motion, through suitable actuating mechanism D, oscillates the valve B and, through mechanism E, oscillates a wiper carrying shaft F.

More particularly, the casing A comprises piston chamber members 10 and 12 and complementary front and rear center members 14 and 16, which members, when assembled together, form a substantially rectangular casing. More particularly, the piston chambers are of box-like shape closed at one end and open at the other and provided at the open end with a peripheral flange 18 having a screw receiving opening 20 at each corner. The top wall 22 of the chamber 10 is further provided with an open ended suction passage 24 connecting at its outer end to a nipple 26 for connecting the motor to any suitable source of fluid pressure. There may also be arranged in conjunction with the nipple 26 any suitable throttle or shut-off valve for starting or stopping the motor. In addition, the top wall 22 is provided with a second passage 28 open at the flange 18 and extending therefrom to adjacent the end wall 30 of the chamber 10 where it is connected through an opening 32 with the interior of the chamber 10.

The top wall of the piston chamber 12 is also provided with a single passage 34 open at the flange 18 and extending therefrom to adjacent the end wall 31 of the chamber 12 where it connects through an opening 36 with the interior of the chamber 12.

To cooperate with the chambers 10 and 12, the front center member 14 is a C section having a front wall 15 and partial top and bottom walls 17 and 19; the outer peripheral dimension corresponding to the outer peripheral dimension of the flange 18 of the piston chambers. To secure the front section and piston chambers together, the top and bottom corners of the center section are provided with threaded openings 38 alignable with the flange openings 20 to receive screws 40 to rigidly secure the parts. As best seen in Fig. 8, the partial top wall 42 of the member 14 terminates in a flat end face 44 functioning as a seat for valve B, as will hereinafter be apparent. The face 44 is further provided with three ports 46, 48, and 50; the central port 46 connecting through a passage 52 to the suction passage 24; the right port 50 connecting through passage 54 to the passage 28 of the piston chamber 10; and the left port 48 connecting through a passage 56 to the passage 34 of the piston chamber 12. It is apparent that when the central port 46 is alternately connected by the valve B to one or the other of the ports 48 or 50, suction is conducted to the corresponding piston chamber and the piston will move towards the side connected. In addition, the front wall 15 of the C section is further provided with a shaft opening 45 through which the wiper shaft F extends from the interior to the exterior of the motor.

To complete the casing, the rear center section 16 is likewise a C section having a rear wall 21 and partial top and bottom walls 23 and 25, which section cooperates with the front section to form a central rectangular member to complete the casing. The top and bottom corners of the rear section 16 are likewise provided with screw openings 38 alignable with the flange screw openings 20 for receiving the screws 40 to rigidly secure the members together. The top wall 23 of the member 16 is cut rearwardly from the inner face thereof to provide, when in abutment with the front center member, a transverse guide 60 and spaced stops 62 for guiding and limiting the movement of the valve B. In addition, the inner face of the rear wall member 21 of center member 16 has integrally formed thereon a tubular bearing 66 which functions as a journal for the inner end of the casing shaft F. The outer end of the bearing 66 lies in the same vertical plane as the guide face 61 of the guide 60, and the center of the bore of the journal is in alignment with the center of the shaft opening 45 in the front center member 14.

In considering the actuating mechanism within the casing, reference may be had to Fig. 8, and the parts will be described in the order there shown, with reference to other figures when necessary. As there shown, the shaft may consist of an elongated rod or heavy steel wire 68 of such length that its inner end journals (when the parts are assembled) in the bearing 66, and it extends therefrom through the casing and carries on its outer end a screw tip 70 upon which a wiper carrying arm may be secured.

Carried on the shaft 68 is a motor mounting sleeve 72 provided with a central bore 74 through which the shaft 68 extends and having an outer diameter of such size as to permit the sleeve to extend through the opening 45 in member 14 to a position where a circumferential flange or anchor 78, provided adjacent its inner end, abuts against the inner face of the wall of the center member 14. When so positioned, the outer end, which is threaded at 76, will extend beyond the car member to receive a suitable nut for securing the motor onto the car body.

Also mounted on the shaft 68 and integrally secured therewith is a second sleeve 82 having an integral gear segment 80. The forward end of the sleeve 82 is provided with an enlarged bore 84 adapted to telescope over the sleeve 72 rearwardly of the anchor 78, and the rear portion of the sleeve 82 is provided with a reduced bore 86 for integrally securing same onto the shaft 68. This securing may be accomplished in any suitable way, as, for example, by knurling the shaft 68 at 88 and making a drive fit into the bore 86, thus securing the shaft and segment together for simultaneous movement.

The sleeve 82 also extends rearwardly through the gear segment to provide a collar 90 for mounting a valve actuating spring 92. The spring 92 is formed to provide a series of coils 94 and a pair of depending spaced legs 96 and 98. The legs 96 and 98 are of such length that when the coil 94 is mounted on the collar 90, the legs will lie in the path of movement of a pair of spaced pins or actuating fingers 100 and 101 carried by the gear segment 80.

Rearwardly of the gear segment the shaft 68 further supports a valve actuator 102 consisting of an arm 103 provided intermediate of its ends with an opening 106 for pivotally mounting it onto the shaft 68. The upper end of the arm 103 carries the valve B, which valve comprises a cup-shaped member 104 (see Fig. 4) having a peripheral edge 105 adapted to abut against the valve seat 44 and of such diameter that when the valve is in either of its two positions it will interconnect the suction port to one of the piston chamber ports. As is well known in this type of motor, when one of the ports is connected to the suction port 22 the other port will admit atmospheric air, thus creating an atmospheric pressure on the corresponding end of the piston; suitable provision being made to admit atmospheric air within the casing; this being done in the present instance by providing a slight clearance between the complementary front and rear members 14 and 16. To mount the valve, the rear face is provided with an outwardly extending pivot 107 receivable within an opening 109 provided in the upper end of the actuating arm 102. The lower end of the valve actuator 102 carries spaced fingers 108 and 110 turned inwardly towards the gear segment and between which the spring legs 96 and 98 of the spring 92 are positioned.

Considering the parts to this point, when they are assembled as seen in Figs. 3 and 4 the gear segment sleeve 82 functions to space the gear segment at a proper distance from the anchor 78 of the sleeve 72, and the collar 90 of the gear segment and the bearing 66 of the rear center member function to properly position the actuator. When the actuator is so positioned, the upper end of the arm will be located in the guideway 60 and between the stops 62. When so located, the valve is maintained in close engagement with the valve seat 44, and, as the upper end of the arm always oscillates within the guideway, the valve will be positively and accurately maintained on the valve seat.

In order to oscillate the shaft 68 and operate the valve actuator 102, the gear segment 80 is operated by the piston C and the movement of the gear segment in turn functions to operate the actuator. To accomplish this, the piston C is of the opposed type and includes a piston member 112 receivable within the chamber 12 and a piston member 114 receivable within the chamber 10. As indicated, each piston member may comprise a pair of spaced plates 116 between which there is mounted a cup leather 118 having a fluid-tight fit with the walls of the piston chambers. The plates 116 and cup leather 118 are secured together by a rivet 120, which rivet also extends through and is secured to the vertical leg 122 of a horizontal rack 124. The rack 124 extends beneath the gear segment 80 and is provided with teeth 126 meshing with the teeth 128 of the gear segment, whereby as the piston is reciprocated the gear segment will be oscillated.

Reviewing the operation to this point, when the parts are in the position shown in Figs. 1 and 2, the chamber 10 will be connected to suction, whereupon the piston will move to the right and cause a counterclockwise oscillation of the gear segment 80. When the gear segment oscillates to the point where the left pin 100 engages the leg 96 of the U spring 92, it will tend to pivot the spring on collar 90, but such pivoting will be prevented by leg 98 engaging the actuator finger 110, resulting in the spring being placed under tension. This tension will tend to pivot the actuator in a counterclockwise direction to shift the valve 104 to uncover the right port 50 and connect the center port 46 with the left port 48. As the piston continues to move to the right, the pin 100 will continue to increase the tension until the tension overcomes the holding force of the vacuum on the valve 104, whereupon the valve will move to the opposite position. Upon a reverse movement of the piston, the same action will occur, except that the spring is now tensioned by the pin 101 engaging the leg 98 of the spring 92 to actuate the valve in the opposite direction.

In order to assure a full stroke of the wiper, means are provided for preventing throw of the valve until the piston has moved through its full predetermined stroke. To accomplish this, there is further provided cooperating means whereby the valve will not shift until the piston has completed its stroke to one side of the cylinder. These means comprise a restraining member 130 carried by the valve actuator 102 and a holding member 132 carried by and integral with the piston. More particularly, the restraining member 130 comprises a finger bent rearwardly from the valve actuating arm 102; this finger being located above the bifurcated portion and beneath the pivot opening 106. The cooperating holding member 132 extends horizontally and is so located relative to member 130 that as the piston moves to the right the member 130 is above the plane of the member 132, whereas when the piston moves to the left and the actuator has shifted to the left, it is below the member 132.

Again referring to Fig. 2, it will be seen that when the chamber 10 is connected to suction, the restraining member 130 lies a shade above the holding member 132, and it will remain in this position until the pin 100 places the spring 92 under tension. When the tension on the spring 92 becomes sufficiently great to overcome the vacuum lock and cause shifting of the valve, should the piston not have reached the end of its stroke, the restraining member 130 will initially be pivoted into tension engagement with the member 132 and thus prevent the shifting of the valve.

As the piston continues its movement to the right (see Fig. 5), the spring 92 will be placed under increased tension, and, finally, when the piston has completed its movement to the right, the holding member 132 (which is pivoting in a path intersecting the path of movement of the member 130) will have moved out of the path of the restraining member and the spring 92 will immediately cause the shifting of the valve to the position indicated in Fig. 6. When this occurs, the restraining member 130 will then be positioned beneath the holding member 132.

Quite obviously, on the return movement, should the valve tend to pivot, the restraining member will engage the under face of the holding member 132 and hold the valve against movement until the stroke of the piston is completed. In this manner, shifting of the valve cannot occur until a full stroke of the wiper has been completed, and when the valve is actuated a positive and quick snap action results. As the restraining member 130 engages the holding member 132 only for a portion of the length at each end thereof, the holding member could comprise two spaced members instead of one continuous member; the latter being used for convenience in manufacture.

A further advantage provided by manufacturing the wiper in the manner described is that any desired predetermined stroke of the wiper arm carrying shaft may be obtained during the making of the motor by properly correlating the stroke of the piston and the angle defined by the fingers 110 of the actuating member. For example, if the fingers 110 are spread apart and the holding member 132 is shortened, the spring will be tensioned upon a shorter movement of the gear segment and the valve released and snapped as soon as the restraining member 130 is released from the shorter holding member. This same purpose can be accomplished by changing the spacing of the pins 100 on the gear segment simultaneously with the shortening of the holding member.

Although the assembly of the motor is apparent from the foregoing description, it will also be seen that in case of repairs to the valve mechanism it is only necessary to remove the front center member 14, whereupon the entire valve mechanism and oscillating shaft 68 may be removed from the wiper. Likewise, due to the construction of the motor in the manner described, the only gasketing required is between the opposed side faces of the top wall 17 of the center member 14 and the flanges of the piston chambers at the points where the suction passages interconnect with one another.

Referring to Fig. 9, there is shown a modified valve actuator spring which may comprise a strip of heavy leaf spring material rolled at one end to provide a loop 140 for pivoting same on the collar 90 and a single depending leg 142 which would be positioned between closely spaced fingers 108, 110. With this construction, upon pin 100 engaging leg 142 the spring will initially pivot on collar 90 until leg 142 engages finger 110 whereupon tension will be exerted and the valve operated as heretofore described.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a motor of the character described, a valve seat having a center port and spaced side ports, a valve movable between two set positions for connecting the center port with one of said side ports, a pivoted actuator carrying said valve, means for operating said actuator to alternately shift the valve from one set position to the other set position, piston means for operating said last-named means, and cooperating means on the valve actuator and the piston means for holding the valve in its last set position until completion of a stroke of the piston.

2. In a motor of the character described, a valve seat having a center port and spaced side ports, a pivoted valve actuator, a valve carried by the actuator, means for pivoting the actuator between two set positions whereby the valve will alternately connect the center port with one of the side ports, piston means for operating said valve actuator means, and cooperating means on the valve actuator and the piston means for holding the valve in its last set position until completion of a stroke of the piston.

3. In a motor of the character described, a valve seat having a center port and spaced side ports, a valve movable between two set positions for alternately connecting the center port with one of the side ports, an actuator for the valve, piston means for actuating said valve actuator, and cooperating means carried by said valve actuator and said piston means and operating in intersecting planes for holding the valve in its last set position until completion of a stroke of the piston.

4. In a motor of the character described, a valve seat having a center port and spaced side ports, a pivoted valve movable between two set positions for connecting the center port with one of said side ports, reciprocating piston means, means operated by the piston means for pivoting said valve between two set positions, a restraining member pivoted with said valve, a holding member reciprocated with said piston into the path of said restraining member during movement of the piston and out of the path of the restraining member at the completion of a piston stroke, whereby said valve will be held in its last set position until a completion of a stroke of the piston.

5. In a motor of the character described, a valve seat having a center port and spaced side ports, a valve movable between two positions for alternately connecting the center port with one of the side ports, a valve restraining member, a piston, means operable by the piston for actuating the valve and valve restraining member, and means carried by the piston and engageable with the valve restraining member for holding the valve in its last set position until completion of a stroke of the piston.

6. In a motor of the character described, a valve seat having a center port and spaced side ports, an operating shaft located beneath the valve seat, a valve actuator pivoted on the valve shaft and extending above and below same, a valve carried on the upper end of the actuator and movable between two set positions for alternately connecting the center port with one of the side ports, spaced fingers provided on the lower end of the actuator, a spring pivotally mounted on the operating shaft and having a leg depending therefrom, said leg being positioned between the spaced fingers on the lower end of the actuator, a reciprocating piston, means operable by the piston for tensioning the spring against one of said fingers to cause pivotal movement of the valve actuator, and means for preventing pivotal movement of the actuator upon tensioning of the spring until completion of a stroke of the piston.

7. In a motor of the character described, a valve seat having a center port and spaced side ports, an operating shaft located beneath said valve seat, a valve actuator pivoted on said shaft and extending above and below same, a valve carried on the upper end of said actuator and movable between two set positions for alternately connecting the center port with one of the side ports, spring means for moving said actuator to move the valve, said spring means being pivotally mounted on the operating shaft and having a pair of spaced depending legs, a pair of spaced fingers on the lower end of said actuator, each engaged by one of said legs, a piston, means operated by the piston for tensioning said spring by biasing one leg toward the other to pivot said actuator, restraining means carried by the piston, and means on the valve actuator engageable with the restraining means for holding the actuator against pivoting upon tensioning of the spring until completion of a stroke of the piston.

8. In a motor of the character described, a valve seat having a center port and spaced side ports, a valve movable between two set positions for alternately connecting the center port with one of the side ports, piston means for actuating said valve, a restraining member movable with the valve, a holding member movable with said piston and movable initially into the path of operation of said restraining member and then out of the path thereof at the completion of a piston stroke, whereby the valve will be held in its last set position when said member is in the path of operation of the valve.

9. In a motor of the character described, a valve seat having a center port and spaced side ports, a pivoted valve actuator, a valve carried by said actuator above the pivot thereof for alternately connecting the center port with one of said side ports upon pivoting of the actuator, a pair of spaced fingers provided on the valve actuator beneath the pivot thereof, a spring pivotally mounted concentrically with the actuator and including a depending leg positioned between the spaced fingers of the actuator, and means for pivoting said spring until the leg engages one of said fingers to tension the spring and pivot the actuator.

10. In a motor of the character described, a valve seat having a center port and spaced side ports, a pivoted valve actuator, a valve carried by said actuator above the pivot thereof for alternately connecting the center port with one of said side ports upon pivoting of the actuator, a pair of spaced fingers provided on the valve actuator beneath the pivot thereof, and a spring pivotally mounted concentrically with the actuator and including a pair of spaced legs depending therefrom and positioned between the fingers on the valve actuator, and means for tensioning one of said spring legs towards the other to place the spring under tension and pivot said actuator.

11. In a motor of the character described, a valve seat having a center port and spaced side ports, an operating shaft located beneath said valve seat, a valve actuator pivoted on said shaft, a valve carried by said actuator above the pivot, a pair of spaced fingers carried by said actuator beneath the pivot, a spring mounted on said operating shaft and depending therefrom and positioned between said spaced fingers and extending below same, a gear segment integral with the operating shaft, a pair of stops carried by said gear segment and alternately engageable with said spring member at a point beneath the actuator fingers, whereby said spring will be tensioned against the finger to operate the valve, a reciprocating piston, and a rack carried by said piston and engageable with the gear segment for oscillating the gear segment to operate said shaft.

12. In a motor of the character described, a valve seat having a center port and spaced side ports, an operating shaft located beneath said valve seat, a valve actuator pivotally mounted on the shaft, a valve carried by the actuator above the pivot, a pair of spaced fingers carried by the actuator below the pivot, an actuating spring, said spring comprising a coil section pivotally mounted on the shaft and having a leg depending to each side of the shaft and positioned between said actuator fingers, a gear segment integral with the operating shaft, spaced stops on said gear segment, and piston means for operating said gear segment, whereby said stops will be alternately brought into engagement with one of said spring legs to tension the spring and pivot the valve actuator.

13. In a motor of the character described, an operating shaft, a casing including front and rear complementary center members, said rear center member having a tubular bearing for journalling the inner end of said operating shaft and said front center member having an opening aligned with said bearing through which the shaft extends, a sleeve mounted on said shaft and extending through said front center opening, said sleeve including an anchor on its inner end abutting against the inner face of the center member for limiting the outward movement of the sleeve, a valve actuator pivotally mounted on the shaft adjacent the tubular bearing, a gear segment fixed to the shaft forwardly of said valve actuator, and a sleeve integral with the gear segment and extending forwardly therefrom and engaging said first-named sleeve rearwardly of the anchor for maintaining said parts in proper alignment within the casing.

14. In a motor of the character described, a casing including front and rear complementary center members, a tubular bearing on the inner face of said rear member, an opening through said front member in alignment with said bearing, a sleeve extending through said opening and having an anchor on its inner end abutting against the inner face of the center member for limiting the outward movement of the sleeve, an operating shaft journalled at its inner end in said bearing and extending through said sleeve, an actuator pivotally mounted on the shaft adjacent the bearing, a second sleeve secured to said shaft and extending from the inner end of said first sleeve to the actuator for maintaining said parts in spaced position, and a gear segment integral with said sleeve, said front center member being readily removable from the casing.

15. In a motor of the character described, a casing including front and rear complementary center members, an operating shaft pivotally mounted in said members, valve mechanism mounted on said shaft, and valve operating mechanism fixed on said shaft, said front center member being readily removable from the casing, whereby said valve mechanism and operating shaft may be removed therefrom.

16. In a motor of the character described, a casing, an operating shaft within the casing, a valve actuator pivotally mounted on the shaft and extending above same, a valve carried on the upper end of said actuator, a transverse recess provided in the upper wall of said casing and including spaced vertical walls, one of said walls being provided with spaced ports to provide a valve seat, the upper end of said actuator and valve being positioned between said spaced walls for guiding same in its pivoting movement and maintaining said valve on the valve seat, and means within the casing for actuating said valve.

17. In a motor of the character described, a casing comprising a pair of piston chambers and complementary front and rear center members, each of said center members including an end wall and top and bottom partial walls, the inner face of the top partial wall of the front center member being arranged in a vertical plane and provided with spaced ports to define a valve seat, the inner face of the top partial wall of the rear center member being recessed to provide a vertical wall spaced from the valve seat and defining therewith a valve guide, an operating shaft journalled in said casing beneath said valve seat, a valve actuator pivotally mounted on said shaft and extending above same and into said valve guide, and a valve carried on the upper end of said actuator and movable on said valve seat upon pivotal movement of the actuator, said front and rear members being readily removable from the casing for dismounting said operating shaft and said valve.

18. In a motor of the character described, a casing having removable front and rear members, a journal provided on the inner face of said rear center member, an operating shaft having its inner end mounted in said journal and extending through an opening provided in the front member of said casing, and a valve actuator, a valve actuating spring, gear segment, and motor mounting sleeve mounted on said shaft in the order named and having no fixed engagement with the casing, whereby upon removal of said front center member said above-named parts may all be readily removed from the casing.

19. In a motor of the character described, a valve seat having a center port and spaced side ports, a pivoted valve actuator, a valve carried by the actuator above the pivot thereof for alternately connecting the center port with one of the side ports upon pivoting of the actuator, a pair of spaced fingers provided on the valve actuator beneath the pivot thereof, a spring pivoted above said fingers and including a depending leg positioned between the spaced fingers of the actuator, and means for pivoting said spring until the leg engages one of said valve actuator fingers to tension the spring and pivot the actuator.

HAROLD W. WHITE.